United States Patent
Jones

(10) Patent No.: US 9,625,176 B2
(45) Date of Patent: Apr. 18, 2017

(54) LOW EMISSIONS DIRECT FIRED AIR HEATER

(75) Inventor: Andrew Jones, Owasso, OK (US)

(73) Assignee: PROTO-TECHNICS, INC., Orange, VA (US)

( * ) Notice: Subject to any disclaimer, the term of this patent is extended or adjusted under 35 U.S.C. 154(b) by 923 days.

(21) Appl. No.: 13/502,258

(22) PCT Filed: Oct. 15, 2010

(86) PCT No.: PCT/US2010/052809
§ 371 (c)(1),
(2), (4) Date: Oct. 4, 2012

(87) PCT Pub. No.: WO2011/047239
PCT Pub. Date: Apr. 21, 2011

(65) Prior Publication Data
US 2013/0098350 A1  Apr. 25, 2013

Related U.S. Application Data

(60) Provisional application No. 61/252,383, filed on Oct. 16, 2009.

(51) Int. Cl.
*B64D 13/08* (2006.01)
*F24H 3/00* (2006.01)
(Continued)

(52) U.S. Cl.
CPC .......... *F24H 3/0488* (2013.01); *F27B 1/22* (2013.01)

(58) Field of Classification Search
CPC ........ F24H 3/025; F24H 3/006; F24H 3/0488; F24H 3/04; F23G 5/165; F23G 7/065; F23L 7/002
(Continued)

(56) References Cited

U.S. PATENT DOCUMENTS 2,896,933 A * 7/1959 Barnes ................. F24H 3/0488
126/85 R
3,706,446 A 12/1972 Briggs
(Continued)

FOREIGN PATENT DOCUMENTS

GB 558 249 12/1943
NL 8 000 691 9/1981

OTHER PUBLICATIONS

Hori et al., An Experimental and Kinetic Calculation of the Promotion Effect of Ydrocarbons on the NO—NO2 Conversion in a Flow Reactor, Twenty-Seventh Symposium (International) on Combustion/The Combustion Institute, 1998, pp. 389-396.*
(Continued)

Primary Examiner — Jorge Pereiro
Assistant Examiner — Wes Anderson, Jr.
(74) Attorney, Agent, or Firm — Young & Thompson

(57) ABSTRACT

Method of combusting hydrocarbon fuel to form combustion products low in nitrogen dioxide (NO2) and carbon monoxide (CO) and mixing the combustion products with additional air to provide a heated air stream suitable for heating enclosed spaces includes the following steps: (a) delivering a fuel stream to a burner assembly; (b) delivering a combustion air stream to the burner assembly; (c) combining the fuel and air streams within a combustion chamber and heat exchanger wherein the mixture is ignited, completely combusted, and the temperature of the products of combustion are reduced; (d) providing tempering air to the external side of the combustion chamber and heat exchanger to transfer heat away from the combustion gases to tempering air; (e) combining the partially heated tempering air and cooled combustion products low in NO2 and CO; and (f) discharging the mixture into a space to be heated.

7 Claims, 3 Drawing Sheets

(51) Int. Cl.
*F24H 3/06* (2006.01)
*F24H 3/04* (2006.01)
*F27B 1/22* (2006.01)

(58) Field of Classification Search
USPC ...... 126/110 B, 110 C, 116 B, 116 R; 431/5; 432/224
See application file for complete search history.

(56) References Cited

U.S. PATENT DOCUMENTS

| | | | | |
|---|---|---|---|---|
| 4,257,389 | A * | 3/1981 | Texidor | F24F 3/14 126/113 |
| 4,852,799 | A | 8/1989 | Grant | |
| 4,993,944 | A * | 2/1991 | Potter | F24H 3/0488 431/350 |
| 5,083,918 | A * | 1/1992 | Potter | F23D 14/34 431/350 |
| 5,875,739 | A * | 3/1999 | Joyce | F23C 5/00 122/18.31 |
| 7,473,095 | B2 * | 1/2009 | Gaur | F23G 5/165 110/210 |
| 9,115,911 | B2 * | 8/2015 | Desi-Seulean | F23D 14/20 |
| 2011/0100007 | A1 * | 5/2011 | Carrick | F01K 21/047 60/645 |

OTHER PUBLICATIONS

Hori et al., An Experimental and Kinetic Calculation of the Promotion Effect of Ydrocarbons on the NO—NO2 Conversion in a Flow Reactor, Twenty-Seventh Symposium (International) on Combustion/The Combustion Institute, 1998, pp. 389-396).*
International Search Report, PCT/US2010/052809, Apr. 4, 2012.

\* cited by examiner

LOW EMISSIONS DIRECT FIRED AIR HEATER

FIELD OF THE INVENTION

The present invention relates to an improved combustion method and apparatus that create low levels of nitrogen oxide and carbon monoxide in combustion products suitable for direct fired space heating.

BACKGROUND OF THE INVENTION

Direct fired space heating, where products of combustion are delivered to a space to be heated, is the most efficient method of heating the space. However, traces of incomplete combustion and combustion related pollutants can decrease indoor air quality. Indoor air quality concerns have resulted in the regulation of oxides of nitrogen dioxide (NO2) from fuel burning equipment where the products of combustion are directly vented into the heated space. This has given rise to a number of techniques and burner improvements to lower emissions. Fuel lean pre-mixing of the air and fuel, various air and fuel staging strategies, and flame protection from tempering air are all strategies that are employed by those skilled in the art of combustion.

Methods and apparatus have also been developed wherein several of these techniques have been employed together. For example, it is within prior art to utilize a fuel lean pre-mix burner in combination with flame protection to lower oxides of nitrogen and reduce carbon monoxide in direct fired air heaters applied to space heating. These systems require precise mixing of fuel and air in tightly controlled ratios and off-design performance can create more emissions than standard emissions equipment. Thus, there is further need for improved methods and apparatus that create low levels of NO2 and CO in direct fired space heating.

SUMMARY OF THE INVENTION

The present invention improves upon the prior art of combustion resulting in low nitrogen dioxide and carbon monoxide through new methods of combustion executed by a novel direct fired air heater design. Nitrogen oxide (NO) and nitrogen dioxide (NO2) are both created during combustion process. NO is generally considered harmless whereas NO2 has been implicated in a number of immune system and respiratory ailments. Published research has shown that unburned hydrocarbons act as a catalyst in transforming the NO to NO2 in the presence of oxygen between 700 and 1000 degrees Kelvin. The same research shows that above 1200 degrees Kelvin, NO2 is reduced to NO. As an additional benefit, carbon monoxide is oxidized above 1050 Degrees K given ample residence time.

The new method consists of completely combusting the fuel with combustion air above 1200 degrees K to force the conversion of NO2 to NO and oxidize CO to CO2. After complete combustion, the combustion products do not contain hydrocarbons that act as a catalyst and can therefore be introduced into the tempering air stream with minimal conversion of NO to NO2. It has been experimentally determined that cooling the products after completion of combustion further minimizes conversion of NO to NO2. Thus, a novel heater has been developed to control the formation of NO2. The process begins by completely combusting the fuel with combustion air within a combustion chamber and heat exchanger assembly while passing tempering air over the combustion chamber and heat exchanger to withdraw some of the heat released by the combustion. The heat exchanger is designed to cool the combustion products only below about 1000 degrees K, as additional cooling is not necessary to prevent significant conversion of NO to NO2 in the absence of hydrocarbons. The tempering air stream and combustion products are then combined and the resulting mixture is discharged into the heated space. The final temperature of the discharged mixture of tempering air and combustion products is matched to the specific application. For example, some codes require that the discharge temperature be limited to 366 degrees K whereas agricultural heaters may discharge at 425 degrees K. The source for combustion air and tempering air may also be matched to the specific application. In some cases, it may be desirable to obtain combustion air and/or tempering air from outside of the heated space. In other cases, secondary ventilation may allow for all of the combustion air and tempering air to be drawn from the heated room.

Further, some applications are combined with humidification of the heated air. Direct injection of water into the combustion zone of direct fired air heaters has been accomplished in prior art, but the cooling effect of the vaporization of the water results in quenching of the flame and increased emissions of CO and unburned hydrocarbons. With the present invention, injection of water occurs within the heat exchanger after the completion of combustion, allowing for the humidification of the heated space without affecting emissions.

DETAILED DESCRIPTION OF THE PREFERRED EMBODIMENTS

Figure 1:
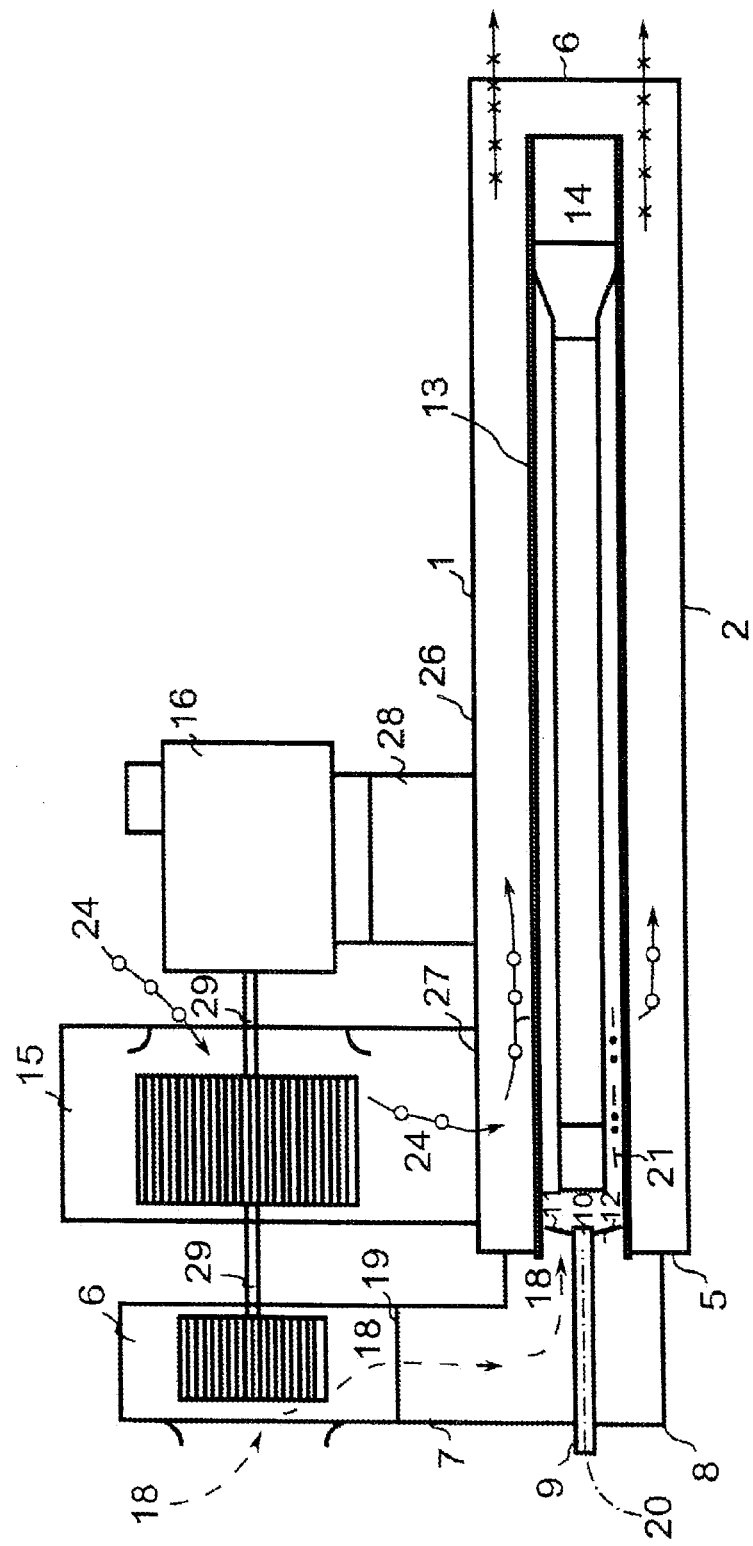
FIG. 1 is a cross-sectional view of a heater according to the present invention.
Figure 2:
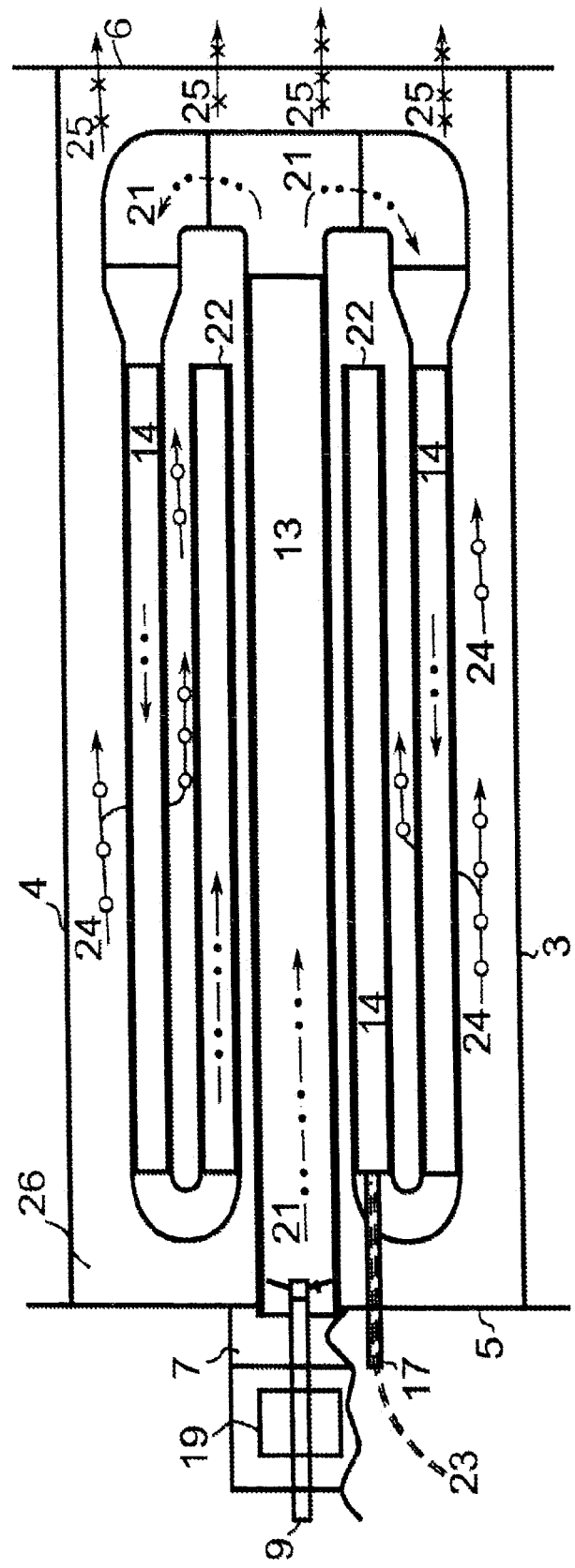
FIG. 2 is top view of the heater with the tempering air fan assembly 15, combustion air fan assembly 6, and drive motor assembly 16 removed for clarity.

The preferred embodiment of the heater consists of the following: an enclosure 26 defined by top panel 1, bottom panel 2, side panels 3 and 4, end panel 5, and discharge 6; a burner assembly 8 consisting of combustion air fan assembly 6, burner plenum 7, fuel conduit 9, fuel nozzle 10, diffuser 11, and igniter 12; combustion chamber 13, heat exchanger 14, tempering air fan 15, and drive motor assembly 16; optionally, a water injection nozzle 17 is included.

In the preferred embodiment, the combustion air stream 18 is supplied by a combustion air fan assembly 6 to burner plenum 7. Combustion air assembly 6 is connected to burner plenum 7 at flange 19. The combustion air stream 18 flows through burner plenum 7, through and around diffuser 11, and mixes with fuel stream 20 that is delivered by fuel conduit 9 and dispersed by fuel nozzle 10. The mixture is initially ignited by igniter 12. The mixture is completely combusted within combustion chamber 13 and heat exchanger 14 to form combustion products 21. Combustion products 21 flow through the heat exchanger 14 and exit the heat exchanger discharge 22. Optionally, water 23 is injected through water injection nozzle 17 into heat exchanger 14 where the water 23 is vaporized by the combustion products. When combustion products 21 (and optionally vaporized water 23) exit the heat exchanger discharge 22, they are combined with tempering air 24 to form discharge air mixture 25 that is discharged into the space through discharge 6. Tempering air 24 is delivered through tempering air fan 15 to the enclosure 26. Tempering air fan 24 is attached to the enclosure 26 at flange 27. The tempering air fan 24 and combustion air fan 6 are driven together through shaft 29 by drive motor assembly 16. Drive motor assembly 16 is supported by frame 28. Those skilled in the art will readily recognize that separate drive motors could be supplied for combustion air fan 6 and tempering air fan 15.

Figure 3:
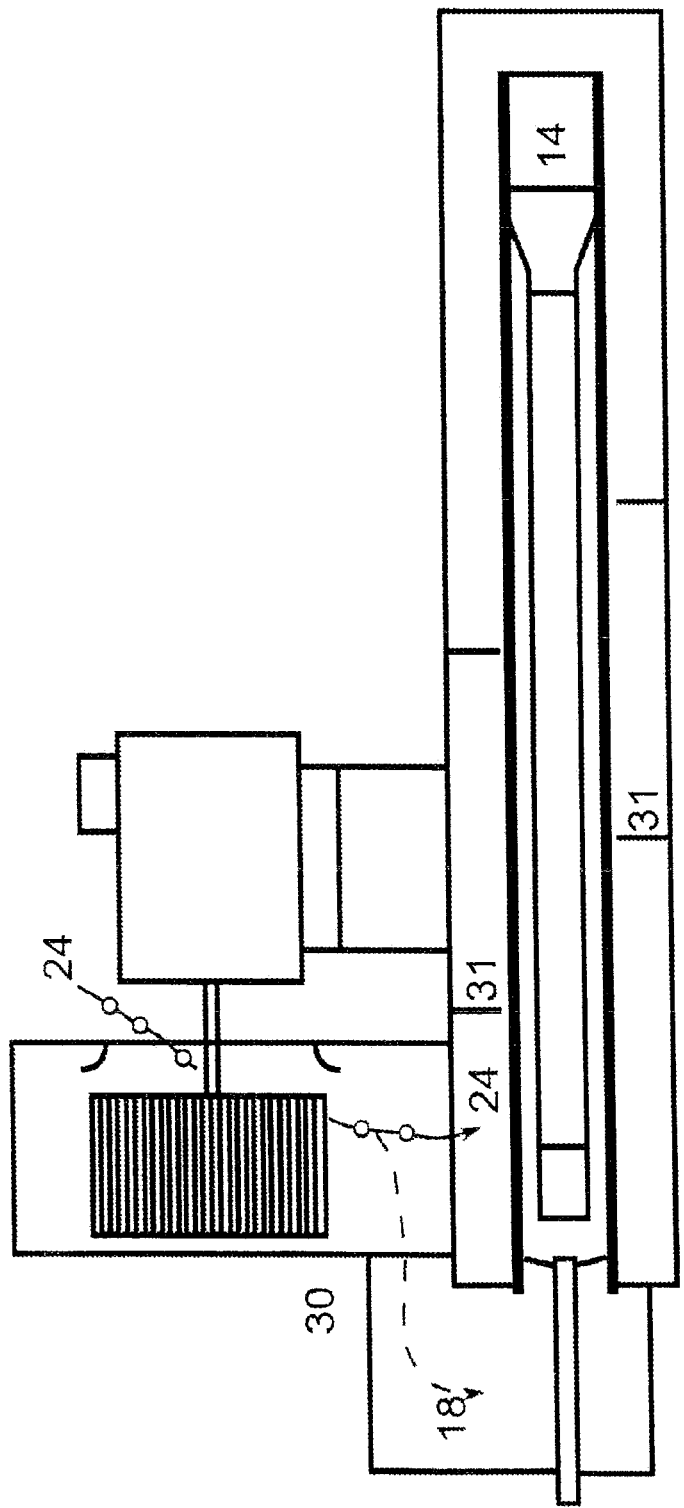
FIG. 3 is an alternate embodiment of the heater.

It will be readily apparent to those skilled in the art as to how to execute the described methods utilizing alternate embodiments of the heater apparatus. One such alternate embodiment is described in FIG. 3. In this embodiment, a portion of tempering air 24 is directed through conduit 30 to serve as combustion air 18. Further, alternate heat exchangers could be utilized to contain the flame and cool the products of combustion prior to combining with the tempering air. In FIG. 3, flow diverters 31 direct tempering air around the heat exchanger 14 and exemplify one such improved heat exchanger design.

What is claimed is:

1. A method of combusting hydrocarbon fuel to form combustion products in which nitrogen dioxide (NO2) is converted to nitric oxide (NO), formation of NO2 from NO is hindered, and carbon monoxide (CO) is oxidized to carbon dioxide (CO2), and mixing said combustion products with additional air to provide a heated air stream suitable for heating enclosed spaces or construction sites comprising the following steps:
  (a) delivering a fuel stream into a burner assembly and toward a combustion chamber, said combustion chamber having a length, an inlet and an outlet being located at distal ends of the length of the combustion chamber, the inlet being proximate to said burner assembly, and the outlet being proximate to a heat exchanger, wherein a flow path is provided from the inlet, extending along the length of the combustion chamber, to the outlet;
  (b) delivering a combustion air stream by a fan assembly into said burner assembly and toward the inlet of said combustion chamber, said combustion air stream being separate from said fuel stream;
  (c) mixing said fuel and air streams from said burner assembly to form a mixture of streams and igniting the mixture of streams within said combustion chamber, proximate to the inlet and distal to the outlet, wherein the mixture of streams is combusted at a temperature above 1200K in order to (i) form combustion products in which no unburned hydrocarbons remain, (ii) oxidize CO in the combustion products to CO2, and (iii) force conversion of NO2 in the combustion products to NO, and wherein the combustion products move along the flow path until exiting the outlet of said combustion chamber and entering said heat exchanger, wherein the combustion products are cooled to below 1000K to hinder NO from converting to NO2 before exiting said heat exchanger;
  (d) providing tempering air to the external side of said combustion chamber and said heat exchanger to transfer heat away from the combustion products to the tempering air, forming partially heated tempering air, so that the combustion products are cooled to below 1000 K before exiting said heat exchanger;
  (e) combining the partially heated tempering air and cooled combustion products after the cooled combustion products exit said heat exchanger; and
  (f) discharging the combined partially heated tempering air and cooled combustion products into a space to be heated.

2. The method of claim 1, wherein combustion air is delivered from outside the enclosed space.

3. The method of claim 1, wherein tempering air is delivered from outside the enclosed space to provide ventilation or outside air exchange.

4. The method of claim 1, wherein tempering air is delivered from inside the enclosed space, and ventilation or outside air exchange is supplied separately to the enclosed space.

5. The method of claim 1, wherein combustion air is delivered from inside the enclosed space.

6. The method of claim 1, wherein water is injected into the heat exchanger to create steam for humidification of the enclosed space.

7. A method of combusting hydrocarbon fuel to form combustion products in which nitrogen dioxide (NO2) is converted to nitric oxide (NO), formation of NO2 from NO is hindered, and carbon monoxide (CO) is oxidized to carbon dioxide (CO2), and mixing said combustion products with additional air within an enclosure to provide a heated air stream suitable for heating enclosed spaces or construction sites comprising the following steps:
  (a) delivering a fuel stream by conduit and a combustion air stream by fan assembly, as separate streams, into a burner assembly and toward a combustion chamber, the combustion chamber having a length, an inlet and an outlet being located at distal ends of the length of the combustion chamber, the inlet being proximate to the burner assembly, and the outlet being proximate to a heat exchanger, wherein a flow path being provided from the inlet, extending along the length of the combustion chamber, to the outlet, and wherein the burner assembly, the combustion chamber, and the heat exchanger are located within said enclosure;
  (b) mixing said fuel stream and said air stream from said burner assembly to form a mixture of streams within said combustion chamber and proximate to the inlet and distal to the outlet, and igniting and combusting the mixture of streams in said combustion chamber at a temperature above 1200K in order to (i) form combustion products in which no unburned hydrocarbons remain, (ii) oxidize CO in the combustion products to CO2, and (iii) force conversion of NO2 in the combustion products to NO, the combustion products moving through said combustion chamber along the flow path, exiting the outlet, and entering said heat exchanger to cool the combustions products to below 1000K to hinder NO from converting to NO2 before the combustion products exit the heat exchanger;
  (c) delivering tempering air into the enclosure and over exterior surfaces of the combustion chamber and the heat exchanger so that heat is transferred from the combustion products contained therein to the tempering air and the combustion products exiting the heat exchanger are cooled to below 1000K and the tempering air is heated;
  (d) mixing, in said enclosure, the heated tempering air and the cooled combustion products exit the heat exchanger; and
  (e) discharging from said enclosure the mixture of the heated tempering air and the cooled combustion products to provide a heated air stream suitable for heating enclosed spaces or construction sites.

* * * * *